(12) United States Patent
Rameshkumar et al.

(10) Patent No.: US 8,321,352 B1
(45) Date of Patent: Nov. 27, 2012

(54) FINGERPRINTING FOR SOFTWARE LICENSE INVENTORY MANAGEMENT

(75) Inventors: Kannan Rameshkumar, Union City, CA (US); David D. Wright, Santa Cruz, CA (US)

(73) Assignee: Symantec Corporation, Mountain View, CA (US)

( * ) Notice: Subject to any disclaimer, the term of this patent is extended or adjusted under 35 U.S.C. 154(b) by 734 days.

(21) Appl. No.: 12/256,838

(22) Filed: Oct. 23, 2008
(Under 37 CFR 1.47)

Related U.S. Application Data

(60) Provisional application No. 60/982,563, filed on Oct. 25, 2007.

(51) Int. Cl.
*G06F 21/00* (2006.01)

(52) U.S. Cl. ........... 705/59; 705/51; 705/52; 705/57; 709/201; 709/202; 709/217; 709/225; 709/226; 709/229; 713/153; 713/160; 713/170; 713/173; 713/185; 717/168; 726/27; 726/31

(58) Field of Classification Search ............ 726/33
See application file for complete search history.

(56) References Cited

U.S. PATENT DOCUMENTS

| | | | |
|---|---|---|---|
| 6,920,567 B1 * | 7/2005 | Doherty et al. | 726/22 |
| 6,968,384 B1 * | 11/2005 | Redding et al. | 709/229 |
| 7,752,140 B1 | 7/2010 | Xu et al. | |
| 7,831,517 B1 | 11/2010 | Vijay et al. | |
| 2002/0100036 A1 * | 7/2002 | Moshir et al. | 717/173 |
| 2004/0193545 A1 | 9/2004 | Shlasky | |
| 2005/0004873 A1 | 1/2005 | Pou et al. | |
| 2008/0189326 A1 * | 8/2008 | Norrie | 707/104.1 |
| 2008/0208754 A1 * | 8/2008 | Zunke et al. | 705/59 |
| 2010/0070416 A1 | 3/2010 | McKelvey | |

* cited by examiner

*Primary Examiner* — Nathan Flynn
*Assistant Examiner* — Bryan Wright
(74) *Attorney, Agent, or Firm* — Meyertons, Hood, Kivlin, Kowert & Goetzel, P.C.; Dean M. Munyon; Paul T. Seegers

(57) ABSTRACT

Various techniques for software license inventory and asset management are disclosed. A fingerprint may be generated and associated with various copies of software applications installed on a software licensee's computer systems. Upon generation, each fingerprint may be stored in a license information database system along with relevant license information for that copy of the software application. A software inventory tool may then be used to collect fingerprints on installed copies of software applications and provide these fingerprints to the license information database system to obtain the corresponding license information. The output of the software inventory tool may be used by a licensee to comply with software license agreements and/or efficiently allocate information technology resources. Methods and systems that provide and process secured, dynamic and persistent tagging of software deployments and usage are also disclosed.

18 Claims, 11 Drawing Sheets

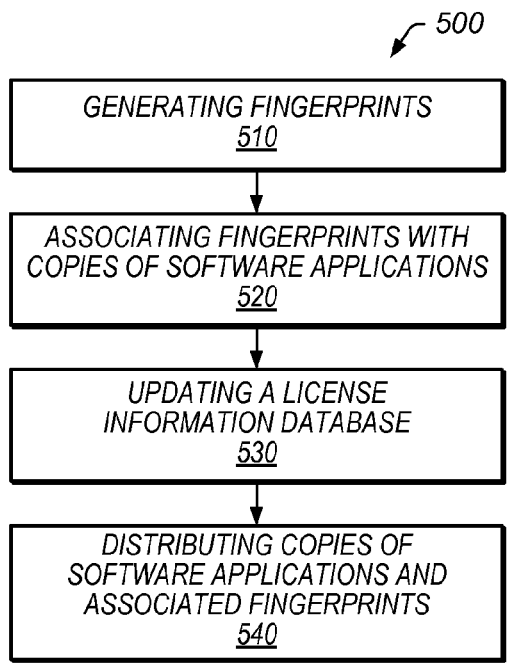
FIG. 5
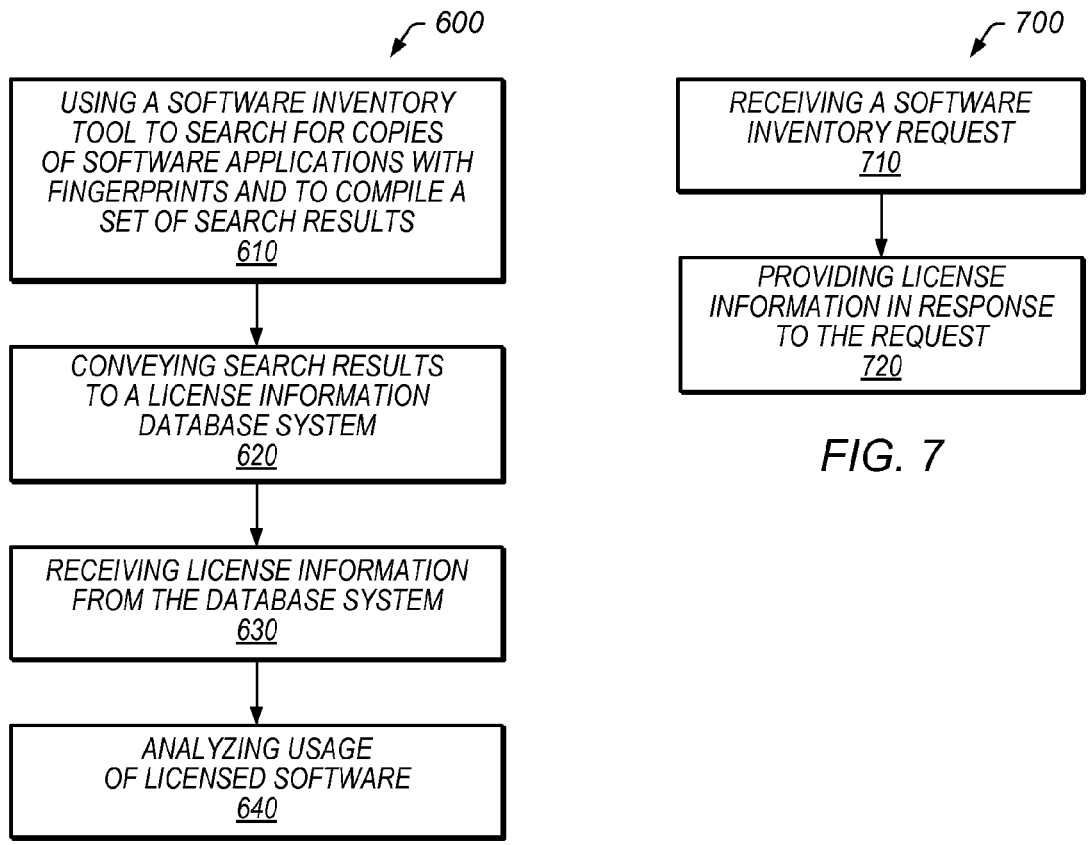
FIG. 6
FIG. 7

FINGERPRINTING FOR SOFTWARE LICENSE INVENTORY MANAGEMENT

This application claims benefit of priority of U.S. Provisional Patent Application No. 60/982,563, entitled "Dynamic, Secure Software Tagging for Software Asset Management with respect to Deployment, Configuration, and Usage" and filed on Oct. 25, 2007, the disclosure of which is incorporated herein by reference in its entirety.

BACKGROUND

1. Field of the Invention

This disclosure relates generally to software asset management, and, more particularly, to the use of fingerprints associated with copies of software applications to facilitate software license inventory management. The disclosure also relates to the use of tags to facilitate software asset management.

2. Description of the Related Art

For software licensees, managing and monitoring installed copies of software applications has long been problematic, particularly in enterprise environments where hundreds or thousands of copies of software applications may be installed. While most licensees want to stay in compliance with their relevant software licensees, the scale of typical enterprise deployments makes compliance difficult.

The problems faced by such licensees include accurately determining how many software assets are installed, determining when such assets were bought/installed (i.e., what software license agreement (e.g., Enterprise License Agreement, or ELA) is applicable to a particular asset), determining what rights are associated with certain assets, and determining whether the licensee's usage of these assets is under or over the amounts provided for in the applicable license agreements. Determination of what license agreement is applicable to a given copy of a software application is particularly problematic, since it is common for licensees to concurrently use copies of a given software application that are subject to multiple different license agreements.

The Symantec License Inventory Manager (SLIM), released in 2006, allows software licensees to locate and count copies of software applications and to determine license keys associated therewith. A given license key, however, can be associated with copies of software applications governed by multiple different license agreements. Furthermore, SLIM does not provide any information regarding applicable license agreements for copies of software applications that it locates.

In addition, the ever-increasing requirements to track software assets generally, because of economic or regulatory reasons, has led to the development of a variety of other software asset management tools. However, such tools may be very limited in their ability to track deployment and usage of software in a standard, systematic and logical fashion.

SUMMARY

Various techniques for software license inventory and asset management are disclosed.

In one embodiment, a method is disclosed that includes receiving a software inventory request from a licensee, the inventory request including a set of fingerprints, individual ones of which is associated with respective copies of one or more software applications that have been licensed to the licensee. In this embodiment, the method further includes, in response to the software inventory request, providing license information (e.g., the applicable license agreement for a particular copy of a software application or an associated date range of the corresponding license) stored in a database to the licensee, where the license information includes information corresponding to the copies of the one or more software applications that are associated with the set of fingerprints included in the software inventory request. The method may further include, in other embodiments, associating fingerprints with individual copies of the one or more software applications, storing the fingerprints in the database along with license information for the copies of the software applications with which the fingerprints are associated, and distributing individual copies of the one or more software applications to the licensee.

In some embodiments, each generated fingerprint is unique. A fingerprint may be generated randomly in some embodiments. Alternately, a fingerprint may be deterministically generated (e.g., sequentially or through other non-random means). In another embodiment, a fingerprint may have a random portion and a customizable portion. Certain fingerprints may indicate, for example, that a particular copy of a software application is an upgraded copy. For a given licensee, fingerprints may exist for a plurality of different types of software applications. Fingerprints may be generated by distributors and/or licensees in various embodiments.

In certain embodiments, associating a fingerprint with a copy of a software application may include placing a fingerprint in a tamper-proof file associated with the copy of the software application. The tamper-proof file may, in various embodiments, be accessible only by the corresponding software application and/or a software inventory tool used to search copies of installed software applications for fingerprints.

In another embodiment, a method is disclosed that includes using a software inventory tool to collect fingerprints associated with copies of one or more software applications on a set of computer systems, and conveying the set of unique fingerprints to a license information database system. In this embodiment, the method further includes receiving license information from the license information database system responsive to the conveyed set of unique fingerprints. The set of computer systems may be those of a particular licensee, for example. The method may further include reconciling usage of software permitted by applicable license agreements with actual usage indicated by the search performed by the software inventory tool. The method may permit determining software usage that is inconsistent with licensed rights. In one embodiment, the software inventory tool may be controlled remotely (e.g., by a software distributor).

In yet another embodiment, a system is disclosed that includes a first set of one or more computer systems configured to generate a unique fingerprint for individual copies of software applications licensed to a first licensee, and a second set of one or more computer systems configured to maintain a license information database storing license information corresponding to copies of software applications licensed to the first licensee, where, in response to receiving a software inventory request including a set of unique fingerprints, the second set of computer systems is configured to provide license information corresponding to the copies of software applications having fingerprints in the set of unique fingerprints. The software inventory request may be sent from a software inventory tool in one embodiment.

In a further embodiment, a system is disclosed that includes one or more processors, a storage subsystem storing license information, where the storage subsystem further including program instructions executable by the one or more processors. The program instructions are executable by the processors to receive a software inventory request that includes a set of unique fingerprints. The program instructions are further executable by the processors to, responsive to the request, provide license information that includes information indicative of the respective versions of the license agreements that are applicable to the copies of software applications corresponding to the set of unique fingerprints.

In still further embodiments, methods and systems that provide and process secured, dynamic and persistent tagging of software deployments and usage are contemplated.

Computer-readable media for implementing various disclosed techniques are also contemplated.

BRIEF DESCRIPTION OF THE DRAWINGS

FIG. 5 is a flowchart of one embodiment of a method for fingerprinting copies of software applications.

FIG. 6 is a flowchart of one embodiment of a method that uses a software inventory tool.

FIG. 7 is a flowchart of one embodiment of a method for receiving and responding to a software inventory request.

DETAILED DESCRIPTION

Figure 1:
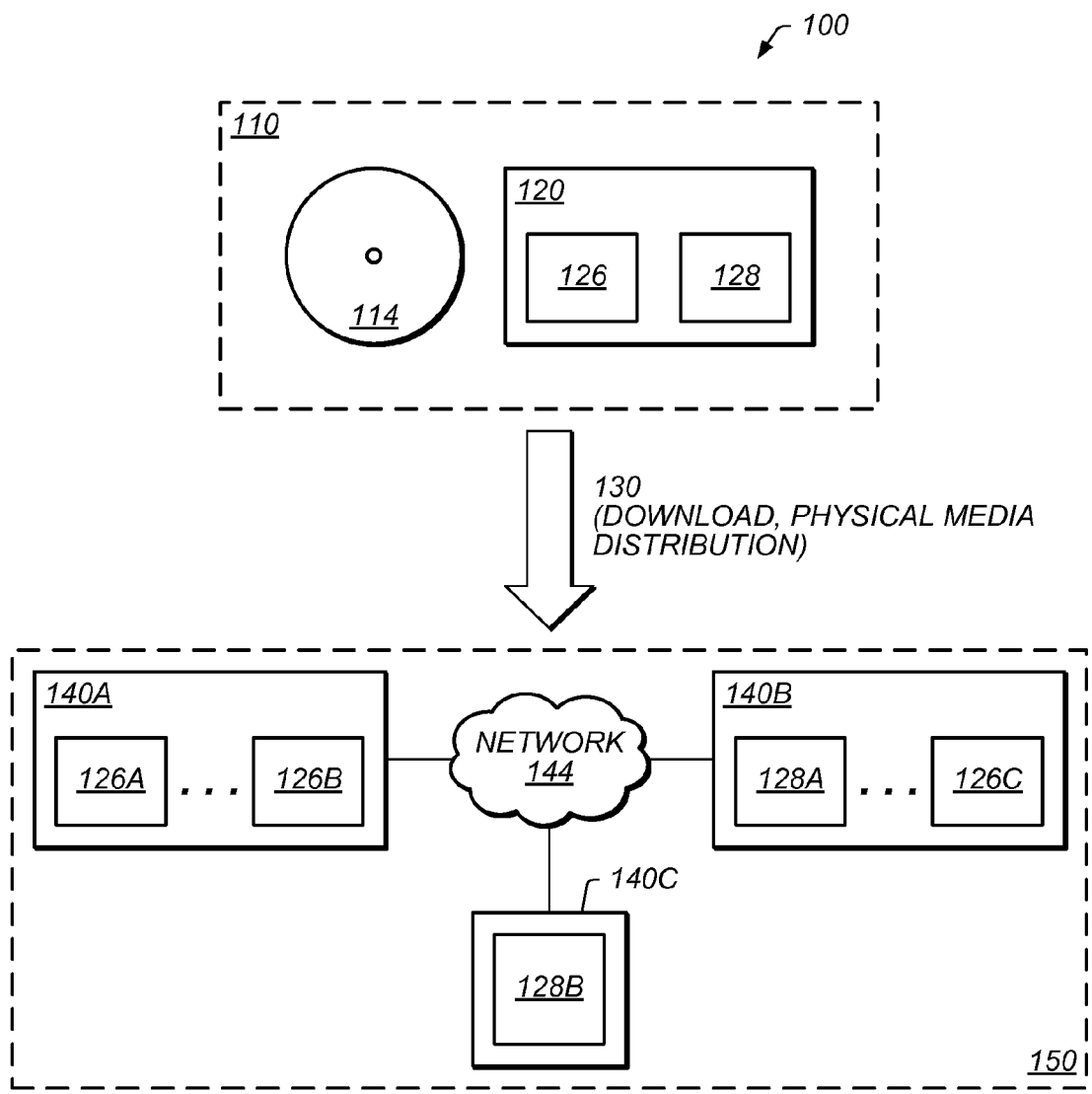
FIG. 1 is a block diagram used to illustrate embodiments of software distribution and installation.

This specification includes references to "one embodiment" or "an embodiment." The appearances of the phrases "in one embodiment" or "in an embodiment" do not necessarily refer to the same embodiment. Particular features, structures, or characteristics may be combined in any suitable manner consistent with this disclosure.

Terminology. The following paragraphs provide definitions and/or context for terms found in this disclosure (including the appended claims):

"Comprising." This term is open-ended. As used in the appended claims, this term does not foreclose additional structure or steps. Consider a claim that recites: "A method comprising associating unique fingerprints with individual copies of one or more software applications . . . " Such a claim does not foreclose associating non-unique fingerprints with individual copies of one or more software applications, and does not foreclose additional steps other than "associating."

"Software." This term refers broadly to computer programs of any form; programs include coded sets of instructions that direct the operation of a computer.

"Software Application." This term refers broadly to an instance of software. A computer backup program is a type of software application. The term "software application" also includes operating systems in addition to programs that run on operating systems.

"Software Inventory Request." This term refers broadly to any message or other form of electronic communication that requests information related to copies of software applications.

"Licensee; Software Licensee." These terms refer broadly to any entity that has entered into a software license agreement of any form with a software distributor and that may have installed one or more copies of software applications on one or more associated computer systems.

"Fingerprint." This term refers broadly to an identifier for a copy of a software application. In some embodiments, a fingerprint may be unique.

"Unique." As used in relation to fingerprints, this term refers to a fingerprint that is intended to be associated with only one copy of a software application. Strictly speaking, a unique fingerprint is not necessarily guaranteed to be associated with only a single copy of a software application; however, the total set of possible fingerprints for a given unique fingerprint is large enough that the probability of two identical fingerprints being generated is very small.

"Associated With." In the context of a "software application" being "associated with" a "fingerprint, this phrase refers to the correspondence between a software application and its fingerprint. In some embodiments, a fingerprint may be placed in a file that is one of a set of files that make up a particular software application. Alternately, a fingerprint may be placed in an application binary itself. In some embodiments, once a fingerprints is "associated with" a copy of a software application, it cannot subsequently be separated from that copy.

"Copy." For a particular software application, an instantiation of that application.

"Distribution/Distribute(d)." Relative to "copies of software applications," "distribution" refers broadly to any method of delivery. In some embodiments, a copy of a software application may be distributed through physical media (e.g., an optical medium such as CD-ROM, DVD-ROM, etc.) or via download over a network (e.g., the Internet).

"Distributor." This term refers broadly not only to an entity that distributes a copy of a software application, but also to an entity that creates a software application. Thus, a "distributor" can refer to any entity in the chain of production from the software creator up to, but not including, the actual end-user of the software (the licensee).

"License Information." This term refers broadly to information relating to applicability and/or terms of, software license agreements.

"Database." This term refers broadly to an organized body of related information stored by one or more computer systems. The term is not limited to any particular type of database.

"Random." As applied to the term "fingerprint," this term refers to lacking any discernible pattern (e.g., produced by a random number generator).

"Tamper-proof." This term refers to a file that cannot be accessed/altered except by one of a predetermined set of programs (e.g., a software application that the file is associated with, a software inventory tool, etc.). Thus a tamper-proof file on a computer system cannot generally be accessed by a user of the computer system.

"Software Inventory Tool." A set of one or more computer programs that collectively performs functionality related to determining information about copies of software applications installed on a set of computer systems (e.g., computer systems of a software licensee).

"Computer System." One or more computing devices including any software stored thereon. A computing device includes at least one or more processors and a memory subsystem, which can include memory storing program instructions executable by the processor unit. An exemplary computer system is described in more detail with reference to FIG. 9.

"Configured." As used herein, this term means that a particular piece of hardware of software is arranged to perform a particular task or tasks when operated. Thus, a computer system that is "configured to" perform task A means that the computer system includes a circuit, program instructions stored in memory, or other structure that, during operation of the computer system, can be used to perform task A. Similarly, a computer program that is "configured to" perform task B includes instructions, that if executed by a computer system, would perform task B.

"Upgraded Copy." An upgraded copy of a software application refers to a set of enhancements to that application, typically provided by the corresponding distributor of the application.

"Licensed Rights." Rights conveyed by a license agreement (e.g., between a distributor and a licensee).

"Remote." As used herein, something is "remote" from something else if the two are located at different geographic facilities.

"Controlled." Run; executed; launched by. In one example, a software inventory tool "controlled" by a distributor may remotely search computer systems of a licensee. Although actions of such a program take place in part on computer systems of the licensee, the tool is nevertheless "controlled" by the distributor.

"Intelligent Fingerprint." A fingerprint having a portion that can be used to determine license information without having to access, e.g., a license information database. In one embodiment, a certain group of positions in an intelligent fingerprint might directly connote a particular version of an applicable license agreement.

"Non-Intelligent Fingerprint." Unlike an intelligent fingerprint, a non-intelligent fingerprint cannot be used to determine any license information without accessing some other set of information (e.g., a license information database).

"Random/Customizable Portions." These terms refer to a fingerprint having a portion that is generated randomly, and having a portion that can be customized (e.g., as desired by a licensee).

"Enterprise Software Application." As user herein, this term refers to application software that performs business functions such as accounting, production scheduling, customer information management, bank account maintenance, backup storage, etc. It is frequently hosted on servers and typically provides services to a large number of users simultaneously, typically over a computer network. An enterprise software application stands in contrast to a typical single-user software application.

"Download." The action of causing the transfer of a computer file or files, typically from a server to a client.

Turning now to FIG. 1, a block diagram of one embodiment of a software distribution and installation environment 100 is shown. As shown, environment 100 includes tangible computer-readable medium 114 and "master" copies 126 and 128 of respective software applications stored on a computer system 120. (Any number of different software applications may be stored by computer system 120 in other embodiments.) Computer-readable media 114 and computer system 120 are shown as enclosed by a dotted line, and correspond to possible means of distributing software applications by distributor 110. (Subsequent references to a software distributor are made to distributor 110.) Thus, a given copy of a software application can be distributed by distributor 110 in several ways, including via a physical memory medium (e.g., medium 114) and via electronic transmission from computer system 120. Collectively, the various possible distribution channels are denoted by reference numeral 130.

Environment 100 also includes a number of computer systems 140 of licensee 150. (Subsequent references to a software licensee are made to licensee 150.) Computer systems 140 may correspond to computer system 1200 described with reference to FIG. 12 below. In the embodiment shown, computer systems 140A-C are coupled via network 144, which in various embodiments, may be, for example, a local-area network, a wide-area network, or a combination thereof. In one embodiment, computer systems 140 are located in an enterprise environment and may be remote from one another. In other embodiments, computer systems may be coupled to disparate networks and thus not directly able to communicate with one another. In other embodiments, various ones computer systems 140 may not be networked at all.

In the embodiment shown, computer systems 140 have various copies of software applications stored thereon. For example, computer system 140A is shown as having numerous stored copies of software applications (e.g., 126A and 126B, two different copies of software application 126), while computer system 140C is shown as storing a single copy 128B of software application 128. These copies of software applications may be stored in any suitable portion of the memory subsystem of computer systems 140 (See FIG. 12 for illustration of an exemplary computer system). Unless otherwise stated, copies of software applications referred to in the present disclosure are subject to a software license agreement.

In many environments (e.g., an enterprise environment), licensee 150 may have a large number (e.g., hundreds or thousands) of copies of installed software applications on computer systems 140. This installed base of applications may include copies of software applications that are subject to many different software license agreements. The combination of a large installed base of applications plus the applicability of various license agreements frequently leads to inventory management problems for licensee 150. For example, licensee 150 may not be able to determine whether it is in compliance with its various license agreement or whether it is paying too much for its license agreements, etc. Techniques are described in detail below that may alleviate such problems in whole or in part.

Figure 2A:
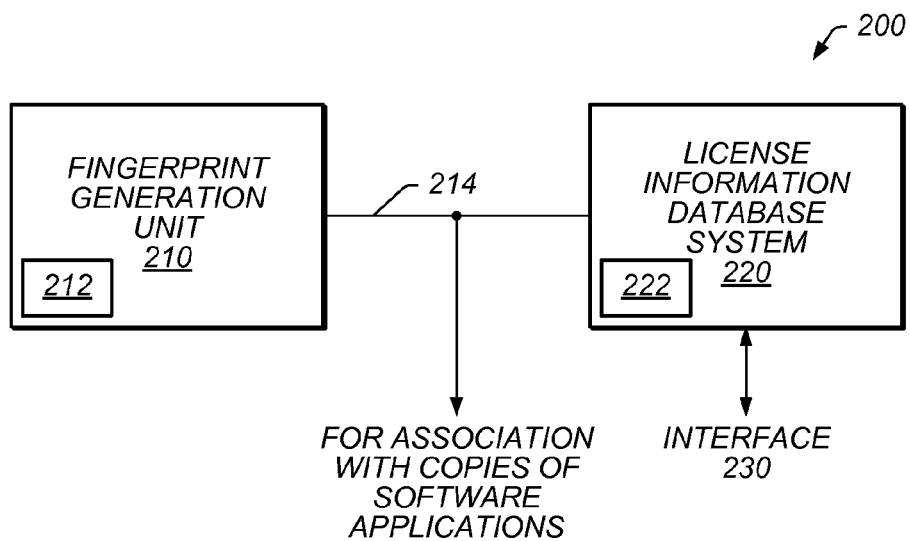
FIGS. 2A-B are block diagrams of embodiments of computer systems configured to perform software license inventory management tasks.

Turning now to FIG. 2A, a block diagram of system 200 is shown. System 200 is one embodiment of a system for performing software license inventory management tasks. As shown, system 200 includes fingerprint generation unit 210 coupled to license information database system 220 via interface 214. License information database system 220 is accessible via an interface 230.

Fingerprint generation unit 210, in one embodiment, includes one or more computer systems that are configured to generate fingerprints for individual copies of software applications that have been licensed to licensee 150. Fingerprint generation unit 210 may be implemented, in one embodiment, by a computer system such as computer system 1200 described with reference to FIG. 12 below. In one embodiment, fingerprint generation may be accomplished by execution of a set of program instructions stored, for example, in computer-readable medium 212 of unit 210.

In one embodiment, fingerprints generated by fingerprint generation unit 210 are unique. Unique fingerprints may be generated in various known ways (e.g., the OSF-specified model for generating Universally Unique Identifiers (UUIDs) or Globally Unique Identifiers (GUIDs)). As one example, a fingerprint generation unit that can generate up to $2^{128}$ possible fingerprints can be said to generate unique fingerprints. While copies of software applications 126 and 128 on computer systems 140 may already include software license keys, frequently many (if not all) copies of a given software application on computer systems 140 have the same license key. As such, license keys may not be useful in differentiating copies of software applications.

In other embodiments, fingerprints generated by fingerprint generation unit 210 are generated in a non-random manner. In one embodiment, fingerprints may be generated in a sequential manner. In one embodiment, certain non-random portions of a given fingerprint may indicate certain useful information (e.g., the fingerprint may include several characters indicating a division of a company of licensee 150, etc.), while other portions of the given fingerprint may have a numeric portion that is generated sequentially. Many other non-random ways of generating fingerprints are possible. Additionally, fingerprints generated by unit 210 can be partially random and partially non-random.

In still other embodiments, fingerprints generated by unit 210 can be modified after generation. For example, in one embodiment, a fingerprint might have a 64-bit random portion, along with a 64-bit portion that is customizable (e.g., by licensee 150). In this manner, a licensee can embed certain meaningful information into the fingerprint. For example, if a copy of software application is designated as belonging to a particular geographic location or business division of a licensee, non-random information in the fingerprint may connote such a designation. In this manner, a licensee may discern useful information from the fingerprint alone. In contrast, in order to discern useful information from a non-intelligent fingerprint, licensee may have to consult license information database system 220, for example.

Fingerprints generated by fingerprint generation unit 210 are not limited to any particular form. Fingerprints may be numeric strings, hexadecimal strings, alphanumeric strings, include symbols, etc. In some embodiments, fingerprints may include symbols such as "-" which delimit groups of characters.

System 200 may be controlled in one embodiment by a software distributor, although in other embodiments, at least a portion of system 200 may be implemented by a licensee. For example, fingerprint generation unit 210 may reside at a licensee's facility, while system 220 resides at a remote facility of a distributor. In general, the various components of system 200 are not limited as to their location.

Fingerprints generated by fingerprint generation unit 210 are output over an interface 214. This interface can be a physical interface (e.g., a network cable or bus) or a software interface, in which a fingerprint output from 210 is provided as an input to another software routine. (In one embodiment, unit 210 and system 220 are implemented on the same computer system. Alternatively, unit 210 and system 220 may be remote from one another.) In system 200, fingerprints generated by unit 210 are provided for association with a copy of a software application as well as to license information database system 220.

Associating a generated fingerprint with a copy of a software application involves storing the fingerprint (typically in some predetermined location). For example, a fingerprint may be associated with a copy of a software application by storing it within the application binary or another file closely associated therewith. In some embodiments, the fingerprint cannot easily be overwritten, changed, deleted, or separated from the application copy except by extraordinary means. Such fingerprints are said to be stored in a "tamper-proof" location. In various embodiments, fingerprints may be encrypted to prevent unauthorized access and/or facilitate detection of unauthorized modifications. For example, in some embodiments, public-key cryptography techniques such as RSA encryption using digital signatures may be employed to facilitate secure encryption/decryption of the fingerprints.

Once associated with a particular copy of a software application, a fingerprint may be conveyed to license information database system 220. In one embodiment, system 220 includes one or more computer systems that are configured to maintain a license information database storing license information corresponding to copies of software applications (e.g., those licensed to licensee 150). Thus, when a fingerprint is generated and associated with a particular copy of a software application, a new record (entry) may be created in the database maintained by system 220. This new record may include, in one embodiment, the newly generated fingerprint along with license information pertaining to the copy of the software application with which the fingerprint is associated. Thus, for example, the new record may include information indicative of which version of a license agreement is applicable to the copy of the software application with which the fingerprint is associated. In another embodiment, a generated fingerprint is not stored in a database entry, but the new record or entry is stored in a manner that the generated fingerprint is usable as an index to access the record or entry.

System 220 is further configured to provide license information in response to receiving a software inventory request (e.g., via interface 230). The software inventory request may include a set of fingerprints. In response to receiving the software inventory request, system 220 is configured to provide license information corresponding to the copies of software applications having fingerprints in the set of fingerprints. In various embodiments, the software inventory request is received from a software inventory tool, as will be described with reference to FIG. 2B. The software inventory tool may be controlled by the distributor or by the licensee, in various embodiments. In one embodiment, system 220 includes program instructions that are executable to facilitate maintaining the license information database. Such program instructions may be stored, for example, in computer-readable medium 222. License information database system 220 is described further with reference to FIG. 3.

Figure 2B:
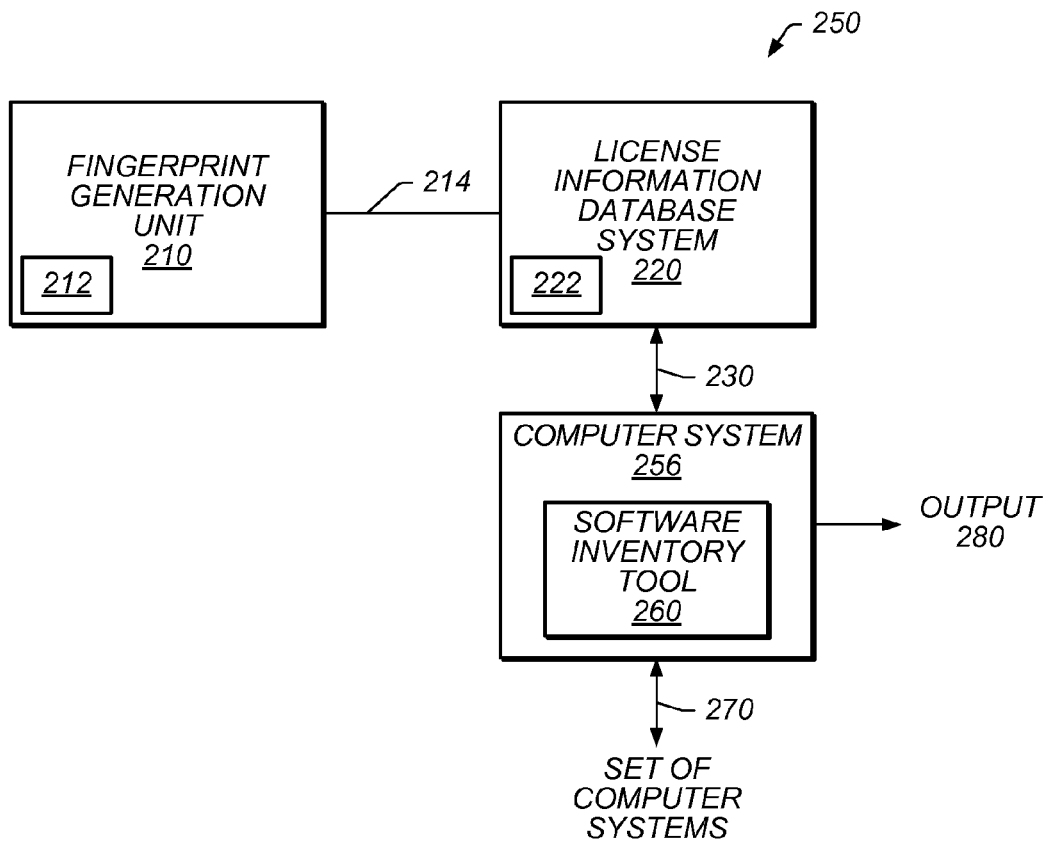

Turning now to FIG. 2B, a block diagram of a system 250 is shown. System 250 is another embodiment of a system for performing software license inventory management tasks. System 250 is similar to system 200; blocks in FIG. 2B that are similar to those in FIG. 2A are numbered identically.

As an extension of system 200, system 250 includes a computer system 256 that is coupled to license information database system 220 via interface 230. As shown, computer system 256 stores program instructions executable by one or more processors of system 256 to implement software inventory tool 260. Software inventory tool may be stored in a computer-readable medium on computer system 256. As will be described further with reference to FIG. 4, computer system 256 is coupled via interface 270 to a set of computer systems (e.g., of licensee 150). Software inventory tool 260 is configured to collect fingerprints associated with copies of software applications installed on this set of computer systems to use the set of fingerprints to access license information database system 220 to obtain license information relating to the copies of the software applications with which the set of fingerprints are associated.

Computer system 256 is further configured to provide output of software inventory tool 260 via interface 280. Software inventory tool 260 may output, for example, an inventory list of licensed software and/or software usage statistics that are generated/obtained from database system 220 using the set of fingerprints collected from searching computers of licensee 150 via interface 270. Usage statistics may include, in one embodiment, an indication of any under-usage or over-usage of software licenses by a licensee. In other embodiments, output of software inventory tool 260 may indicate any software usage by a licensee that is inconsistent with the licensee's rights.

In one embodiment, computer system 256 may be a computer system of licensee 150 (although software inventory tool 260 may be supplied to licensee 150 by distributor 110 in some embodiments). In such an embodiment, interface 230 may be over a wide-area network. In other embodiments, computer system 256 may be a computer system of distributor 110. In these embodiments, interface 270 may be over a wide-area network.

Figure 3:
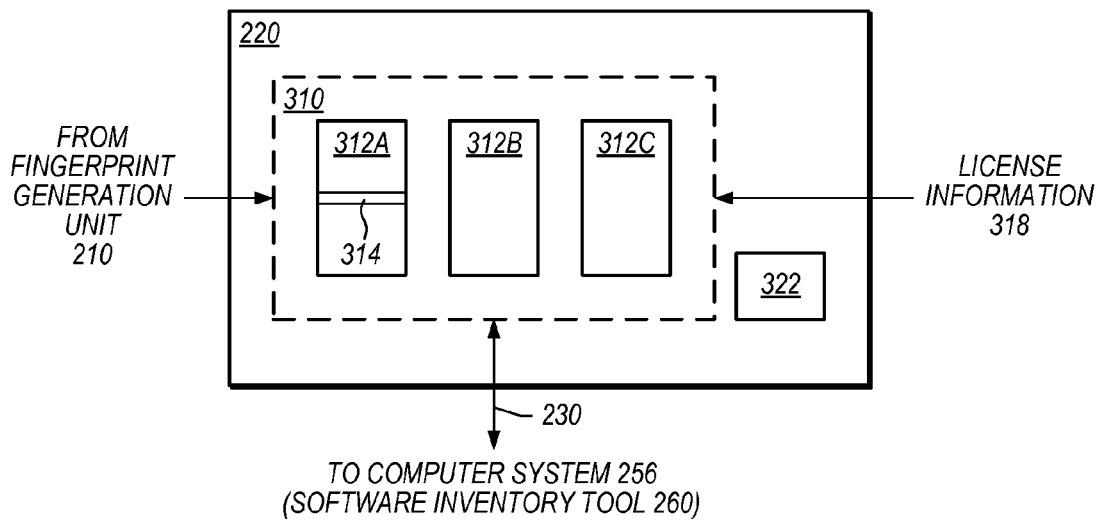
FIG. 3 is a block diagram of one embodiment of a license information database system 220.

Turning now to FIG. 3, a block diagram of license information database system 220 is depicted. As shown, system 220 includes database 310, indicated by a dashed line. Database 310 can be implemented on a plurality of computer systems/storage volumes, indicated by reference numerals 312A-C in FIG. 3. As indicated above, the term "database" is meant to refer broadly to any type of information store, and is not to be limited, for example, to a particular type of database (e.g., relational database). Program instructions for implementing/maintaining database 310 may be stored in computer-readable medium 322 and executed by one or more processors (not shown) within system 220.

System 220/database 310 may receive information from fingerprint generation unit 210, as well as license information 318. License information 318 may be received from another database, input manually, etc. For example, during order processing, new entries may be created for each customer transaction, and license information 318 may be entered into one or more records in a table of database 310. Exemplary license information that may be entered may include (but is not limited to): Customer Name, Bill to, Ship to, Installed at addresses and other contact information (business, technical contacts), Purchase Order Numbers(s), Contract Id(s), Date of transaction, Start, End dates of Contracts, SKUs of product(s) involved in the contract, Product License Key(s), Salient Customer Usage Rights excerpted from the contract(s), and son. In the same table along with the above records, the associated digital fingerprint(s) may be captured/entered in. In some implementations, a separate table may be used that stores the SKU(s), Product License Keys and the digital fingerprint(s), with Purchase Order Numbers(s) and/or Contract Id(s) being used as primary keys, for example. As noted above, license information 318 refers broadly to information associated with a software license. For example, license information 318 may include information indicative of what license agreement applies to a particular copy of a software application. Thus, when a fingerprint is generated and associated with a particular copy of a software application, that fingerprint, along with corresponding license information 318, may be stored in a record in database 310 (e.g., record 314). Alternately, as noted above, license information 318 may be stored in a location in database 310 that is accessible using a corresponding fingerprint as an index.

System 220 and database 310 also have interface 230 that has been referred to above. Interface 230 permits software inventory tool 260 on computer system 256 to make software inventory requests. In one embodiment, a request may include a set of fingerprints that have been identified as corresponding to various copies of software applications. In response to receiving such a request, system 220 is configured to provide license information for the copies of the software applications with which fingerprints in the set of fingerprints are associated.

Figure 4:
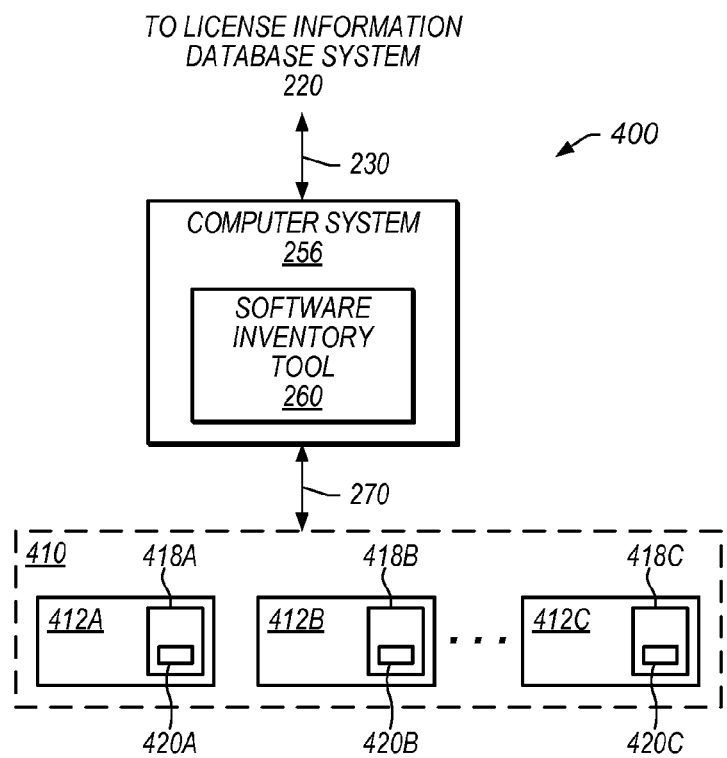
FIG. 4 is a block diagram of one embodiment of a system in which software inventory tool 260 may be used.

Turning now to FIG. 4, a block diagram of a system 400 is shown. System 400 illustrates the use of software inventory tool 260. In the embodiment depicted, computer system 256 includes program instructions executable to implement software inventory tool 260. (In another embodiment, the program instructions executable to implement software inventory tool 260 may merely be accessible to computer system 256—for example, over a network connection.) Computer system 256 (and thus software inventory tool 260 in the embodiment shown) is coupled to license information database system 220 via interface 230. Additionally, computer system 256 is coupled to a set of computer systems 410 via an interface 270, which may be any suitable type of interface, including one which operates over a wide-area network. Computer systems 410 include individual computer systems 412 (representative systems 412A-C are depicted in FIG. 4). These systems 412 may be at one facility (e.g., connected by a local-area network) or may be geographically dispersed at different facilities. In the embodiment shown, each computer system 412A-C includes a copy of a software application from distributor 110 (these copies are depicted by reference numerals 418A-C respectively). Each of these copies 418A-C has an associated respective fingerprint 420A-C that was generated by fingerprint generation unit 210 in a manner as described above. Although fingerprints 420 are shown as being within boxes 418, FIG. 4 is merely meant to demonstrate an association between the copy of the software application 418 and the respective fingerprint 420. Of course, computer systems 412 may also includes copies of software applications that do not have associated fingerprints.

In one embodiment, software inventory tool 260 is executable on computer system 256 to search computer systems 410 of licensee 150 for copies of software applications having associated fingerprints. In alternative embodiments, agent software (or other functionality, as desired) installed on each of the computer systems 410 of licensee 150 may be configured to gather fingerprints associated with copies of software applications installed thereon, and to convey the fingerprints to software inventory tool 260. In doing so, software inventory tool 260 may thus compile a set of fingerprints. In one embodiment, this set may have all fingerprints that are collected by tool 260, while in other instances, this set may have some but not all fingerprints that tool 260 has collected. This set may then be provided over interface 230 to license information database system 220. Tool 260 may then process information provided by system 220 to output analysis, statistics, or other data relating to software usage via output 280 shown in FIG. 2B.

In one embodiment, computer system 256 may be a computer system of distributor 110. In such an embodiment, computer system 256 may need authorization to access computer systems 410 of licensee 150. In another embodiment, computer system 256 may be a computer system of licensee 150, but software inventory tool 260 is controlled remotely by distributor 110 (e.g., system 256 is located inside a firewall of licensee 150, but distributor 110 is permitted to initiate a search of computer systems 410, for example). In yet another embodiment, computer system 256 is a computer system of licensee 150 and is controlled by licensee 150.

Searching of computer systems 410 may be performed in any known manner. For example, tool 260 may search a predetermined list of computer systems. In one embodiment, such a list may be updated dynamically. In another embodiment, tool 260 may consult a network directory or other resource that provides a list of computers to search. Once a particular computer system 412 is located, tool 260 may search at least a portion of its memory subsystem for copies of software applications having associated fingerprints (e.g., those generated by fingerprint generation unit 210). Certain portions of the memory subsystem of computer system 412 may not be searched in some embodiments. Searching of an individual computer system 412 may proceed in any suitable manner (e.g., eliminating certain types of files from further searching due to file type, size, etc.).

During a search of computer systems 410, tool 260 may, in one embodiment, be looking for a fingerprint having a predetermined format residing in one of a set of possible predetermined locations. The use of the term "predetermined" here merely indicates that tool 260 is looking for fingerprints in a format used by fingerprint generation unit 210 and located in a location associated with a copy of a software application (e.g., within the binary or in an associated file).

As noted above, in some embodiments, agent software may be used to gather fingerprints associated with copies of software applications installed on computer systems 410. In such embodiments, a separate agent software module may be installed on each computer system 412, and may be configured to gather fingerprints corresponding to copies of software applications installed on the associated system. In some embodiments, fingerprints may be gathered by accessing predetermined memory locations and/or files of the associated system and detecting whether valid fingerprints are present. The fingerprints gathered by each agent software module may then be conveyed to software inventory tool 260 through interface 270. In this manner, software inventory tool 260 may collect a set of fingerprints received from different computer systems 412, and then provide a corresponding software inventory request including the set to license information database system 220 through interface 230. It is noted that in some embodiments, each agent software module may be configured to convey fingerprints to software inventory tool 260 on a periodic schedule or upon detection of such fingerprints. In other embodiment, software inventory tool 260 may configured to request fingerprints from each of the agent software modules. It is further noted that each each agent software module may execute autonomously.

Turning now to FIG. 5, a flowchart of method 500 is depicted. Method 500 is one embodiment of a method relating to fingerprinting. Method 500 commences in step 510, in which one or more fingerprints are generated. As described above, these fingerprints may be generated in any suitable fashion. In one embodiment, fingerprints may be unique. Fingerprints may alternately be intelligent or non-intelligent fingerprints as described above. Fingerprints may have random and customizable portions as described above in some embodiments. Fingerprints may also include information indicative of various properties of software applications. For example, step 510 may include generating a fingerprint that indicates that a particular copy of a software application is an upgraded version of the software application in one embodiment. Step 510 of method 500 may be implemented by fingerprint generation unit 210 in one embodiment. In one embodiment, step 510 may include performing a function in response to a function call from another program (e.g., a program involved in the distribution of software applications).

In step 520, method 500 includes associating fingerprints generated (e.g., in step 510) with a copy of a software application. For example, consider a copy A of a software application and a fingerprint ZZZ generated in step 510. In step 520, fingerprint ZZZ may be associated with copy A in some suitable manner (e.g., placing fingerprint ZZZ in the binary of copy A, placing fingerprint ZZZ in a file associated with the set of files used for installation of copy A, etc.). In one embodiment, step 520 may be performed by a software application used in the distribution/copying of software applications. For example, after a software application is copied, a software program may make a function call to receive a fingerprint (e.g., generated in step 510), and then associate, in step 520, the fingerprint returned as the result of this function call with the copy of the software application.

In step 530, method 500 includes updating a license information database (e.g., system 220). This step, in one embodiment, enables license information about a copy of a software application to be retrieved, given a fingerprint associated with that copy. In one embodiment, after step 530, a record in a license information database can be accessed by using a fingerprint as an index value. In other embodiments, step 530 includes storing a fingerprint generated in step 510 in a record or other entry in the database. As noted above, the database may include any variety of information, including license information associated with a particular copy of a software application. For example, in one embodiment, the database indicates which versions of license agreements are applicable for various copies of software applications. Note that in some embodiments, step 530 is not necessarily performed after step 520; the updating of the license information database may occur before the associating of step 520, for example.

In step 540 of method 500, copies of software applications that have been associated with fingerprints (e.g., those generated in step 510) are distributed to a software licensee (e.g., by physical media or via a network connection such as over the Internet). Note that step 540 is an optional step in method 500. (By stating that step 540 is "optional," this does not in any way imply that remaining steps in method 500 are mandatory in all disclosed embodiments. Rather, recitation of step 540 as "optional" is merely done for the sake of brevity. This disclaimer applies to all use of the term "optional" in the present disclosure.) In embodiments of method 500 that do not include step 540, for example, steps 510-530 may all be performed by licensee 150. In other embodiments, all steps of method 500 (which may or may not include step 540) may be performed by distributor 110.

Embodiments of method 500 thus permit copies of software applications to be distributed with associated fingerprints in a manner that permits these fingerprints to be used to access license information stored in a license information database. Such information may be usable to facilitate software license inventory management tasks.

Turning now to FIG. 6, a flowchart of a method 600 is depicted. Method 600 is one embodiment of a method for using a software inventory tool to facilitate software license inventory management tasks.

In step 610, method 600 includes using a software inventory tool (e.g., tool 260) to search for copies of software applications with fingerprints. In one embodiment, the search of step 610 is performed on a set of computer systems of licensee 150. This search may be performed in any suitable manner in various embodiments, as has been previously described. Software inventory tool 260 may search computer systems in sequence or in parallel. Similarly, within a given computer system, tool 260 may search files sequentially or in parallel. In certain embodiments, for each copy of a software application located by tool 260, it may search in a set of one or more predetermined locations for an associated fingerprint. In some embodiments, a fingerprint is located in a location (e.g., a file) that is accessible only to the software inventory tool. In other embodiments, a fingerprint is located in a location that is accessible only to the software inventory tool and the copy of the software application corresponding to the fingerprint. In these embodiments, such fingerprints are typically not readable by other programs.

Step 610 further includes compiling a set of results from the search. In one embodiment, this set of results includes fingerprints located by the search. In certain embodiments, the set of results generated in step 610 only includes those fingerprints generated according to some predetermined format or generated by some predetermined generation unit (e.g., 210). For example, step 610 may, in some embodiments, be limited to looking for fingerprints of a predetermined format in one of a predetermined set of locations for a given copy of a software application.

Note that in some alternate embodiments, searching may be performed by a software module/program that is separate from the software inventory tool and that returns search results to the tool. In addition, as described above, in some embodiments of step 210 agent software modules may be used to gather fingerprints associated with copies of software applications. The software inventory tool may then collect the fingerprints conveyed from the agent software modules of different computer systems.

Note further that in some embodiments, the search of step 610 may be initiated/controlled by the party whose computers are being searched (e.g., licensee 150), while in other embodiments, the search of step 610 may be initiated/controlled by a different party (e.g., distributor 110 or some third party). Accordingly, in some instances, searching may be controlled remotely.

In step 620, method 600 includes conveying search results such as those obtained in step 610 to a license information database system (e.g., system 220). In one embodiment, step 620 may include conveying a set of fingerprints to the database system. Step 620 may thus involve a "software inventory request" as that term is used herein. Step 620 may be performed by the software inventory tool of step 610 in some embodiments; in other embodiments, it may be performed by a different entity such as a software module that receives search results from step 610.

In step 630, method 600 includes receiving license information from the database system referenced in step 620. The results returned in step 630 are generated and returned responsive to step 620 in one embodiment. As has been described previously, "license information" can include various types of information, including information indicative of the applicable license agreement for a given copy of a software application. In some embodiments, step 630 of method 600 is performed by the software inventory tool of step 610, but may be performed by a different entity such as a software module that receives a set of fingerprints from step 610 and makes a software inventory request based thereon.

Finally, in optional step 640, method 600 includes analyzing usage of licensed software. This step is intended to be quite broad. Step 640 may include, in one embodiment, determining whether copies of software applications are being used inconsistently with the rights granted under the appropriate license (e.g., a copy of a software application is being used by one division of a company when it was actually licensed to another division of the company). In another embodiment, step 640 may include determining under-usage and over-usage of software applications according to various applicable license agreements. Step 640 may be performed automatically by a software inventory tool such as tool 260 and may include the outputting of various graphical data, reports, etc. In various embodiments, usage information indicative of the use of licensed software may be obtained by monitoring the installation and/or execution of copies of software applications on computer systems 214.

In a further optional step of method 600 (not shown in FIG. 6), the results of step 640 may be used to reconcile actual software usage with licensed rights. Such a step may include, for example, licensee 150 purchasing additional software licenses from distributor 110 to be in compliance with its various applicable license agreements. In another embodiment, this further optional step may include deleting certain copies of software applications that are being used in a manner that is inconsistent with applicable licensed rights. Such deletion may occur automatically (e.g., by the software inventory tool), or after receiving permission (e.g., from a system administrator or other user).

Turning now to FIG. 7, a flowchart of a method 700 is depicted. Method 700 is one embodiment of a method for receiving and responding to a software inventory request.

Step 710 of method 700 includes receiving a software inventory request. In one embodiment, the request may include a set of fingerprints located by a search (e.g., a search performed in step 610 of method 600). In another embodiment, the software inventory request includes information derived from the set of fingerprints. Step 720 of method 700 includes providing license information in response to the request of step 710. As has been discussed previously, the license information provided by step 720 may include a variety of information, including information indicating what versions of license agreement are applicable to copies of software applications identified by the request (e.g., copies of software applications may be identified by a set of fingerprints included in the request of step 710). In one embodiment, steps 710 and 720 may be performed by license information database system 220.

Figure 8:
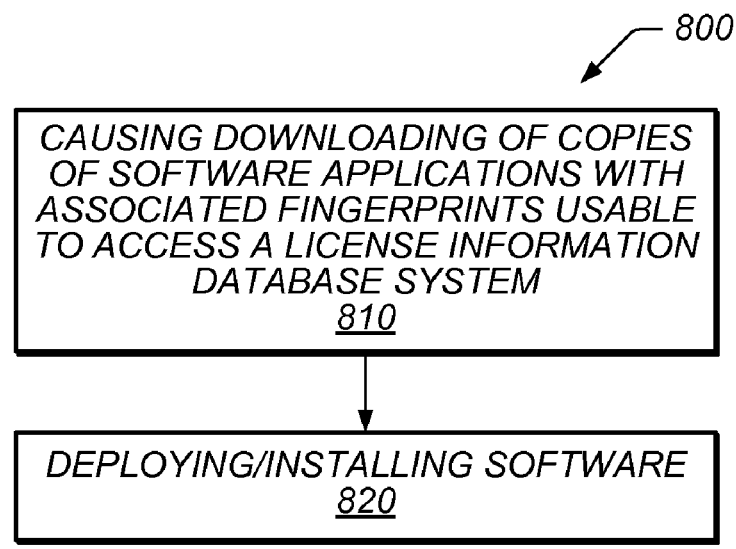
FIG. 8 is a flowchart of one embodiment of a method for downloading copies of software applications with associated fingerprints.

Turning now to FIG. 8, a flowchart of a method 800 is depicted. Method 800 is one embodiment of a method for causing downloading of software applications. Step 810 of method 800 includes causing downloading of software applications with associated fingerprints (e.g., fingerprints generated and associated with copies of software applications in steps 510 and 520 of method, respectively). In one embodiment, step 810 is performed by licensee 150 (e.g., step 810 may be practiced by placing a download request). In other embodiments, step 810 is performed by distributor 110 (e.g., step 810 may be practiced on a server of distributor 110). Step 820 of method 800 includes the deploying and/or installing of the downloaded software.

Figure 9:
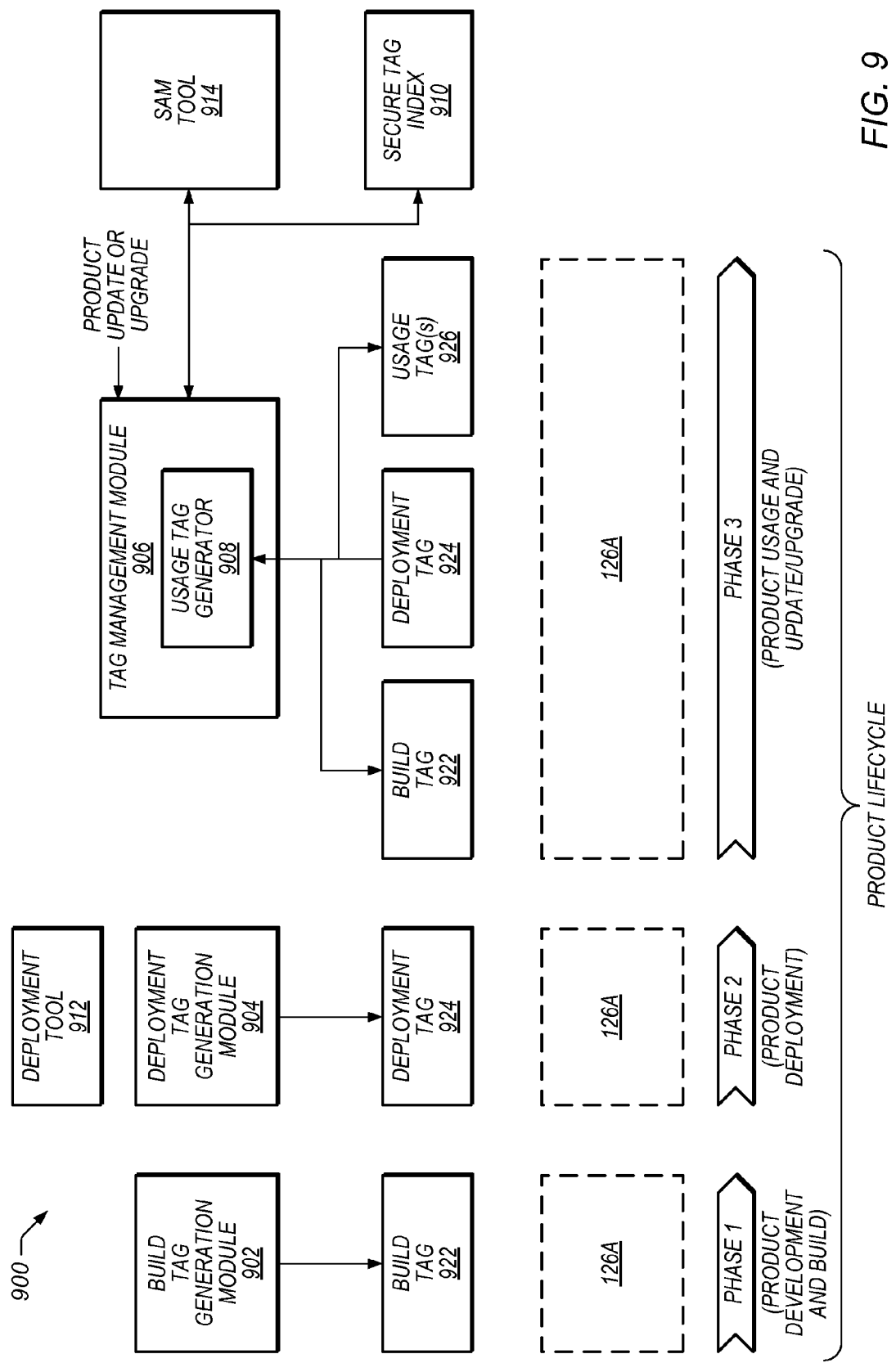
FIG. 9 is a block diagram of an environment for providing software tagging to facilitate software asset management.

Turning next to FIG. 9, a block diagram of an environment 900 for providing software tagging to facilitate software asset management is shown. In the depicted embodiment, environment 900 includes functionality configured to create, manage, and manipulate a set of tags, referred to herein as a build tag, a deployment tag, and a usage tag(s), associated with a deployed copy or instance of a software application, such as copy 126A of software application 126 as described previously with reference to FIG. 1. As shown, environment 900 may include a build tag generation module 902, a deployment tag generation module 904, and a tag management module 906 including a usage tag generator 908. Environment 900 may additionally include a secure tag index 910, a deployment tool 912, and a SAM (software asset management) tool 914.

As will be described in further detail below, environment 900 may provide a paradigm in which at any time the complete combination of individual tags for a deployed software instance may contain current and historical attributes of the deployed software, as well as particular attributes of any single deployment instance over time. The paradigm may also be used by software asset management tools (such as SAM tool 914) or by any other tool allowing open inspection of text (or tag information in other forms) at the location of the tags, to facilitate reporting on deployment, deployment history, usage, usage history and current deployment status, for example.

Figure 12:
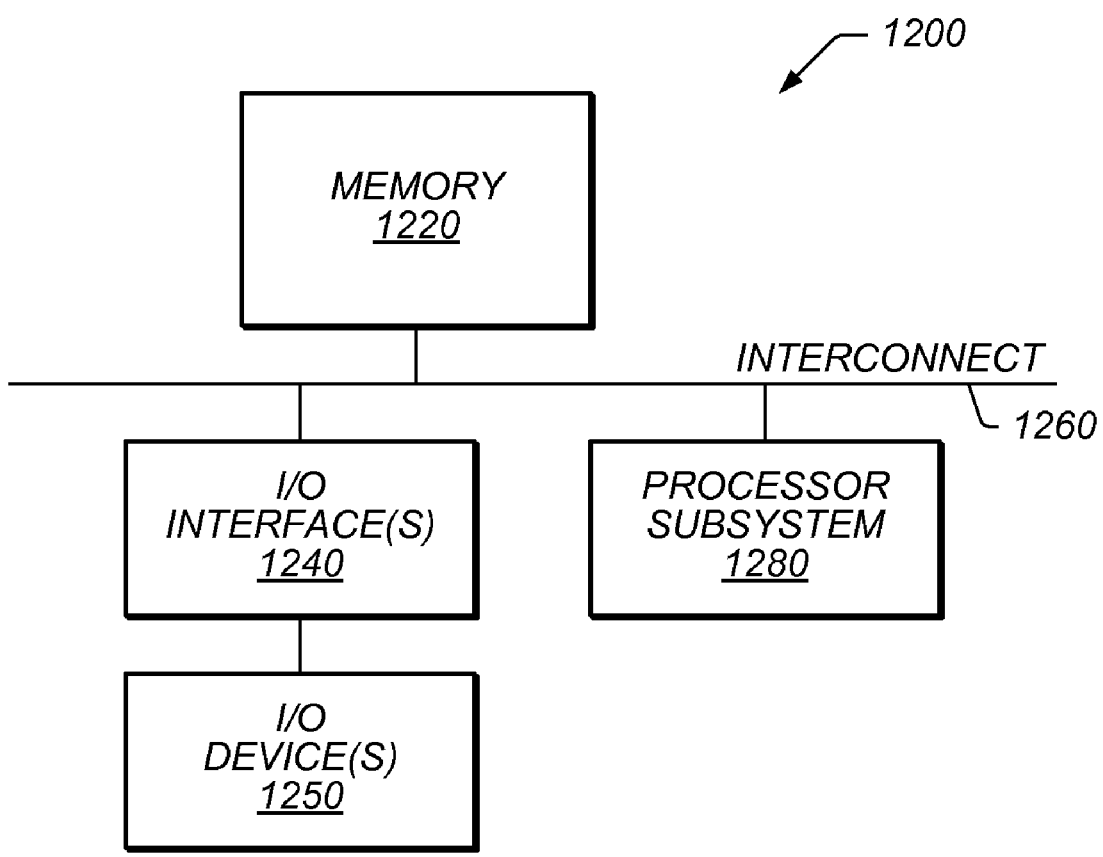
FIG. 12 is a block diagram of one embodiment of a computer system.

In some implementations, the functionality of build tag generation module 902, deployment tag generation module 904, and tag management module 906 including usage tag generator 908 may be implemented by respective sets of program instructions stored on computer readable media and executable by one or more computers. FIG. 12 illustrates components of an exemplary computer including memory that may store such program instructions. It is noted that, depending upon the embodiment, certain aspects of the functionality of build tag generation module 902, deployment tag generation module 904, and tag management module 906 including usage tag generator 908 may be implemented by program instructions executed by one or more computers residing at a first location (e.g., the functionality of build tag generation module 902 may be performed at a location of distributor 110, as referenced above in FIG. 1), while other aspects of the functionality may be implemented by program instructions executed by one or more computers residing at a second location (e.g., the functionality of deployment tag generation module 904 and/or tag management module 906 including usage tag generator 908 may be performed at a location of licensee 150). It is noted that instructions for implementing build tag generation module 902, deployment tag generation module 904, and/or tag management module 906 including usage tag generator 908 may be included in software modules such as run-time libraries, procedures, processes, etc., that may be initiated by, for example, a software application, an installer/software deployment tool (e.g., deployment tool 912), and/or a SAM tool (e.g., SAM tool 914), in order to create and/or read tags for a deployed instance of software. In still further embodiments, certain aspects of the functionality, such as code embodying portions or the entirety of tag management module 906 including usage tag generator 908, may be implemented by instructions included as part of the binary code of each software application for which tags are generated (e.g., as part of the binary code of copy 126A of software application 126).

Figure 10A:
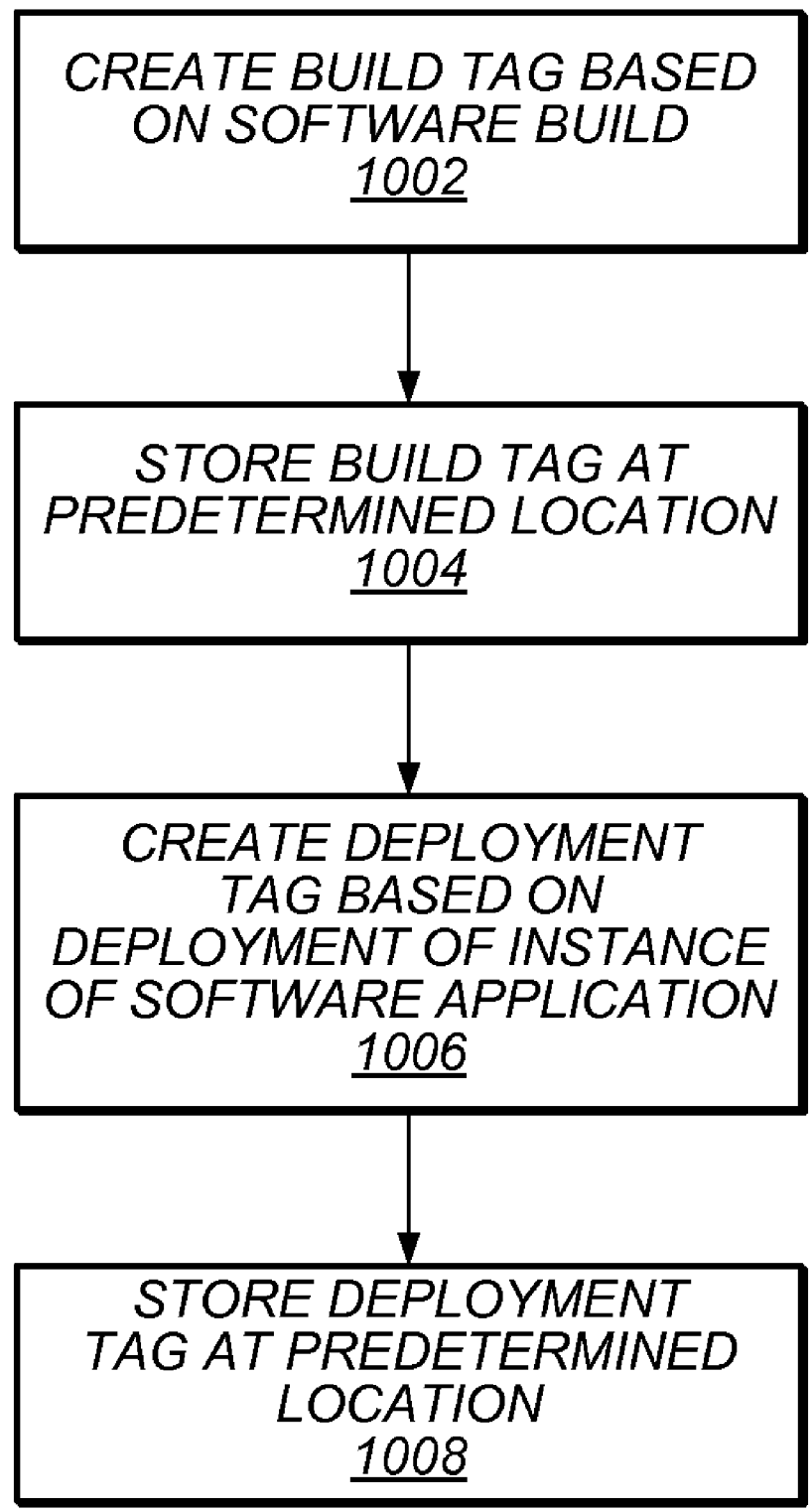
FIGS. 10A-10C are flow diagrams illustrating operations associated with one embodiment of the environment of FIG. 9.
Figure 10B:
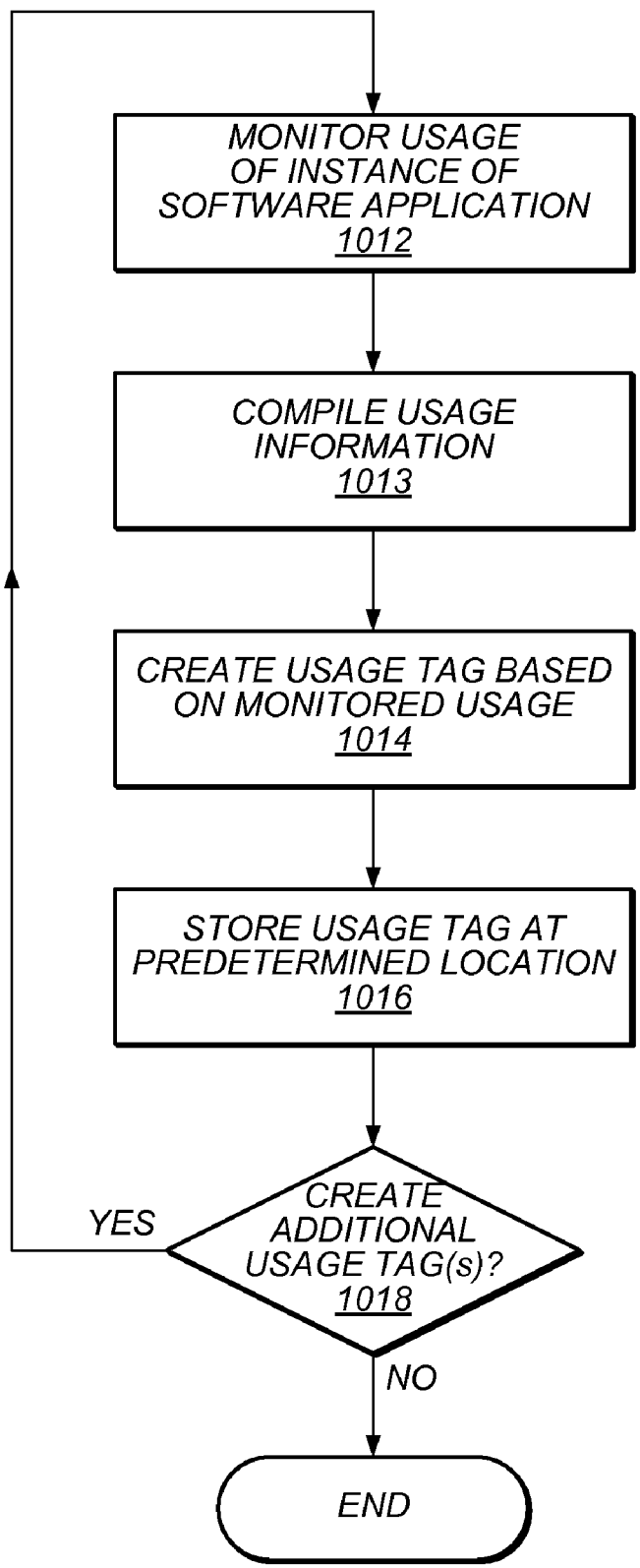
Figure 10C:
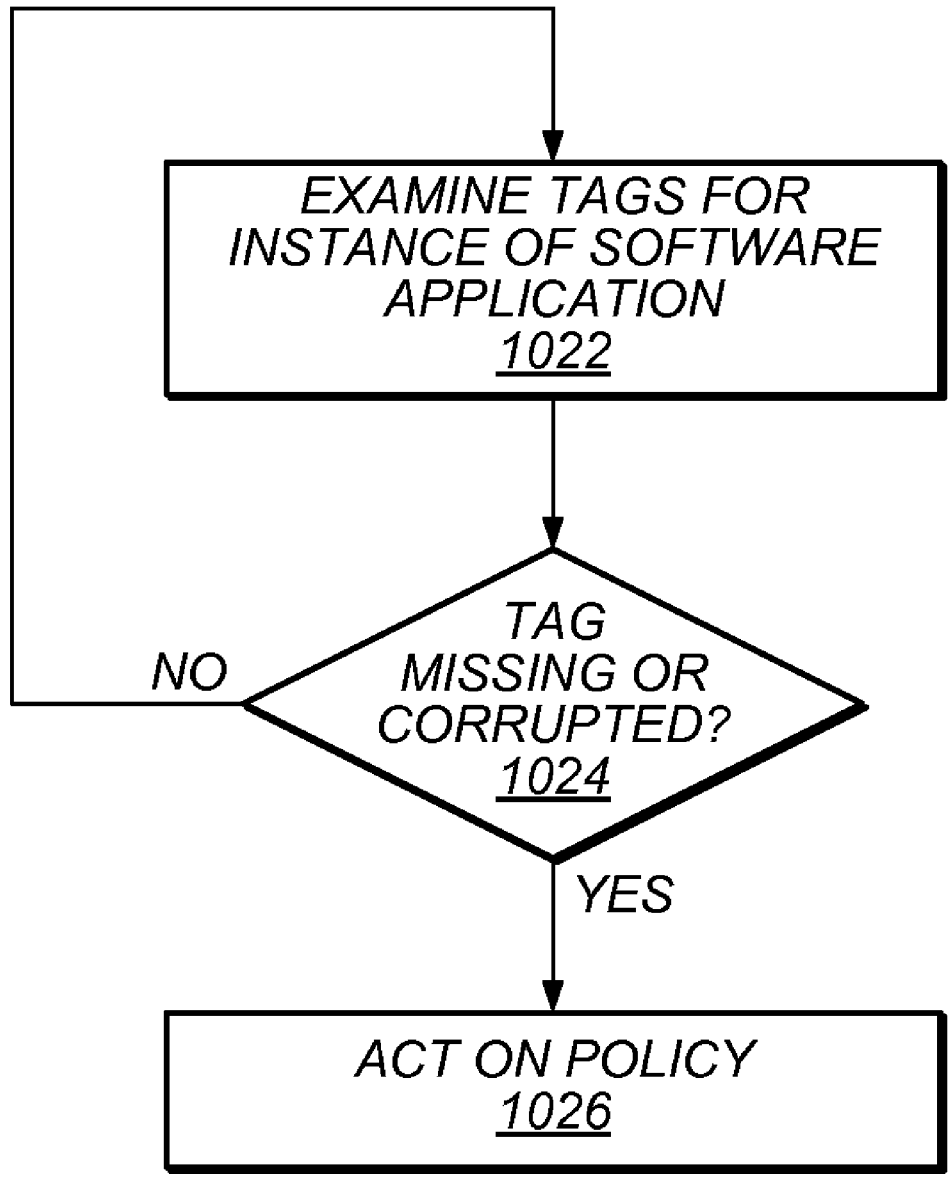

FIGS. 10A-10C are flow diagrams illustrating operations associated with one embodiment of the illustrated features forming environment 900. Referring collectively to FIGS. 9 and 10A-10C, an example of a manner in which build, deployment and usage tags may be utilized during various phases of the lifecycle of an instance of deployed software is shown. In the following example, build, deployment, and usage tags are generated for copy 126A of software application 126. It is understood that corresponding tags may be similarly generated in environment 900 for each copy of numerous additional software applications.

Phase 1 as shown is associated with the development and build phase of a software application. During phase 1, build tag generation module 902 may be configured to create a build tag 922 corresponding to software application 126 (FIG. 10A, block 1002). Build tag 922 may contain a description of the build, including information relating to numerous particular attributes or characteristics, as desired, of software application 126. For example, in one embodiment, build tag generation module 902 may be configured to provide information within build tag 922 specifying any one or more of the following attributes or characteristics that may be associated with software application 126:

Software ID
Language
License type (meter/model)
Manufacturer
Part #
Tag Version
Product
Product Version
Platform
Abstract (e.g., I line description)
Available Features/Components & Versions
Signature
Public Key
Verification Policy It is noted that in various embodiments, numerous alternative specific attributes or characteristics associated with the development and/or build of a software application may be included as part of the information contained in a build tag, as desired. It is further noted that, depending upon the embodiment, information forming build tag 922 may be provided manually from a user and/or provided from a database system, such as license information database system 220 as described above. Upon creation, build tag generation module 902 may be configured to store build tag 922 at a predetermined location associated with software application 126, for example, within the application binary or another file closely associated therewith (FIG. 10A, block 1004). Alternatively, associating the build tag 922 with a particular copy of software application 126 may be deferred until a time, as discussed below.

Phase 2 is associated with the deployment phase of an instance of a software application. For example, during the deployment phase, deployment tool 912 may be utilized to deploy the copy 126A of software application 126 on a host computer (e.g., of licensee 150). In addition to installing the copy 126A on the target host computer, the deployment tool 912 and/or other functionality within deployment tag generation module 904 may be configured to cause build tag 922 (which in some embodiments may be provided from distributor 110, for example) to be placed at a predetermined location as part of the overall product deployment. For example, build tag 922 may be associated with copy 126A of software application 126 by storing it within a file associated therewith, as described previously.

Also during the deployment phase, deployment tag generation module 904 is configured to create a deployment tag 924 that corresponds to copy 126A of software application 126 (FIG. 10A, block 1006). Upon creation, the deployment tag 924 may also be placed at a predetermined location, for example, within a file associated with copy 126A of software application 126 (FIG. 10A, block 1008). In some embodiments, both build tag 922 and deployment tag 924 may be stored in the same file associated with a given copy of a software application. Deployment tag 924 may contain information specifying any one or more of the following attributes or characteristics that may be associated with the deployment of copy 126A of software application 126:

Software ID
Deployment—Reference #
Date/Time
Deployment Tool
Packages
Sign-Off Information
Release
Release Roll Out
Release Verification
Platform Info
Abstract (e.g., I line description)
Signature
Public Key
Verification Policy It is noted that in various embodiments, numerous alternative specific attributes or characteristics associated the deployment of an instance of a software application may be included as part of the information contained in a deployment tag, as desired. It is further noted that, depending upon the embodiment, at least some of the information forming deployment tag 924 may be provided manually from a user, derived from build tag 922 and/or provided from a database system, such as license information database system 220 as described above.

Phase 3 is associated with the usage of an instance of a software application. In particular, in one embodiment, usage tag generator 908 is configured to monitor usage of copy 126A of software application 126 during its execution on an installed host computer (FIG. 10B, block 1012). Various specific aspects associated with run-time operations of copy 126A may be monitored usage tag generator 908, as desired. For example, usage tag generator 908 may be configured to monitor aspects of usage such as dates and times of execution, features of application that are invoked or utilized, status of application, identities of users, resource utilization such as CPU demand, storage requirements and/or I/O bandwidth utilization, among numerous other possible aspects, as desired. Based on the monitored usage, a variety of usage information may be gathered/compiled by usage tag generator 908 (FIG. 10B, block 1013). Usage tag generator 908 may be configured to subsequently create a usage tag 926 corresponding to copy 126A of software application 126 that contains the usage information derived as a result of the monitored usage, as well as other information relating to copy 126A, such as identification information, etc. (FIG. 10B, block 1014). For instance, an exemplary implementation of usage tag 926 may contain information specifying any one or more of the following attributes or characteristics that may be associated with the usage of copy 126A of software application 126:
Software ID
Feature ID(s)
Feature Version(s)
Usage Meter/Model
Temporal Attributes (start/stop time/date)
Status (on-line/standby, etc.)
Signature
Public Key
Verification Policy It is noted that in various embodiments, numerous alternative specific attributes or characteristics associated the usage of an instance of a software application 126 may be included as part of the information contained in a usage tag. Upon creation, tag management module 906 (or usage tag generator 908) may be configured to place, and possibly remove, the usage tag 926 at a predetermined location, such as a file associated with copy 126A of software application 126 (FIG. 10B, block 1016). In some embodiments, usage tag 926 may be stored in the same file that also contains the build tag 922 and/or deployment tag 924 associated with the copy 126A of software application 126, as discussed above.

Depending upon the embodiment, multiple usage tags may be created during execution of an instance of a software application. In such embodiments, if additional usage tags are to be created (FIG. 10B, block 1018), monitoring of the application repeats and additional usage information may be gathered/compiled, as discussed above, based on the on-going usage. It is noted that in some embodiments, the monitoring of aspects of an application's usage to gather usage information for inclusion within different usage tags may be performed during concurrent operations (e.g., in parallel threads).

As described above, in various embodiments, build tag 922, deployment tag 924 and usage tag(s) 926 may be associated with copy 126A of software application 126 by storing them within a file (or multiple files) associated with copy 126A. The information forming each of the build, deployment, and usage tags may be in any of a variety of specific forms, such as text, XML, binary, etc. In some embodiments, the build tag 902, deployment tag 924 and/or usage tag(s) 926 may be stored in a tamper-proof location such that they cannot easily be overwritten, changed, deleted, or disassociated from the application copy except by extraordinary means. In various embodiments, build tag 922, deployment tag 924 and/or usage tag(s) 926 may be encrypted to prevent access and/or facilitate detection of unauthorized modifications to the information contained therein. For example, in some embodiments, public-key cryptography techniques such as RSA encryption may be employed to facilitate secure encryption/decryption of the build, deployment and usage tags. For this purpose, the information contained in the various tags may include public key and signature information.

As was also described above, in some embodiments, code embodying portions or the entirety of tag management module 906 including usage tag generator 908 may be implemented by instructions included as part of the binary code of each copy of each software application for which tags are generated (e.g., copy 126A of software application 126). For example, in one embodiment, the functionality of usage tag generator 908 as described herein is entirely embodied within the binary code of each copy of each software application for which usage tags are generated. In some implementations, the instructions included in the binary code to implement such functionality may comprise tamper-proof code. For example, the instructions may be encrypted to prevent unauthorized modification thereof. During run-time, the encrypted instructions may be decrypted using known techniques to allow execution thereof.

In addition, in some embodiments, the build, deployment and usage tags created for an instance of a software application may be stored within secure tag index 910. Secure tag index 910 may be embodied by any of a variety of specific data storage devices, including persistent, non-volatile storage devices such as magnetic disk, optical disk, etc. In various embodiments, tag management module 906 may be configured to index/log the creation and removal of the build, deployment and/or usage tags in secure tag index 910 to allow accumulation of deployment and usage history of an instance of a software application over time. Thus, for example, when a given copy of a software application is removed from one host computer and deployed on a different host computer, although a new deployment tag may be created for the copy that replaces a previous deployment tag, the history of the respective deployment tags for the copy may be retained within secure tag index 910 for subsequent reporting/software management purposes, as desired. It is noted that tags stored within secure tag index 910 may be encrypted in a manner similar to that described above to prevent unauthorized access and/or modification thereof.

As shown in FIG. 9, phase 3 of the product lifecycle may also be associated with the update/upgrade of an instance of a software application. In some embodiments, when a copy of a software application is updated or upgraded, tag management module 906 may be configured to create additional build and deployment tags (e.g., in a manner as described above) corresponding to the updated/upgraded copy. In some implementations, the original build and deployment tags (i.e., as created prior to the update/upgrade) may not be removed from their respective predetermined stored locations. In other embodiments, tag management module 906 may be configured to add information specifying attributes or characteristics of the update/upgrade to the original build and deployment tags corresponding to copy of the software application. Tag management module 906 may also be configured to store such additional (or supplemented) tags within secure tag index 910.

Still further, tag management module 906 may also be configured to examine the build, deployment, and/or usage tag(s) corresponding to an instance of a software application periodically, during run-time, to ensure the tags have neither been removed nor tampered with (FIG. 10C, blocks 1022 and 1024). For example, tag management module 906 may be configured to use the signature embedded in a given tag to verify the tag's authenticity, according to the applicable encryption algorithm. The tag management module 906 may further be programmed to act according to a specific policy, as desired, in the event a tag is missing, is unreadable, or corrupted (FIG. 10C, block 1026). In some embodiments, tag management module 906 may be configured to use policy information contained within a given tag, assuming it may be read, that specifies particular actions to be taken by tag management module 906 in the event the tag is determined to be corrupt or altered in an unauthorized way. In some embodiments, tag management module 906 may similarly be configured to use policy information contained within a first tag (e.g., the build and/or deployment tag) associated with an instance of a software application that specifies actions to be taken by tag management module 906 in the event another tag (e.g., a usage tag) associated with the same instance is determined to be corrupt or altered in an unauthorized way. Tag management unit 906 may be configured to act on policies including any of a variety of actions, as desired or specified, in the event a tag is removed or corrupted. For example, in some embodiments, an alert to a user or system administrator may be generated or displayed upon such detection. Actions according to more stringent policies may alternatively or additionally be taken. For example, tag management module 906 may be configured to disable operation of the instance of the software application in response to determining that a corresponding tag has been removed or is corrupted.

In various embodiments, SAM tool 914 may additionally be designed to interact and perform specific functions using the tagging paradigm of environment 900. For example, in one embodiment, SAM tool 914 may be configured to access tags stored in secure tag index 910 to thereby provide reports on deployment configuration, usage, and history of a given instance of a software application. SAM tool 914 may be configured to use the tag information to monitor and/or enforce license compliance, or to assess license fees according to the deployment and/or usage information conveyed in the tags for a given instance of a software application. Similar to the above description, it is noted that SAM tool 914 may be configured to verify that tags have not been removed and/or tampered with, and to otherwise act on policy if such verification fails.

Figure 11:
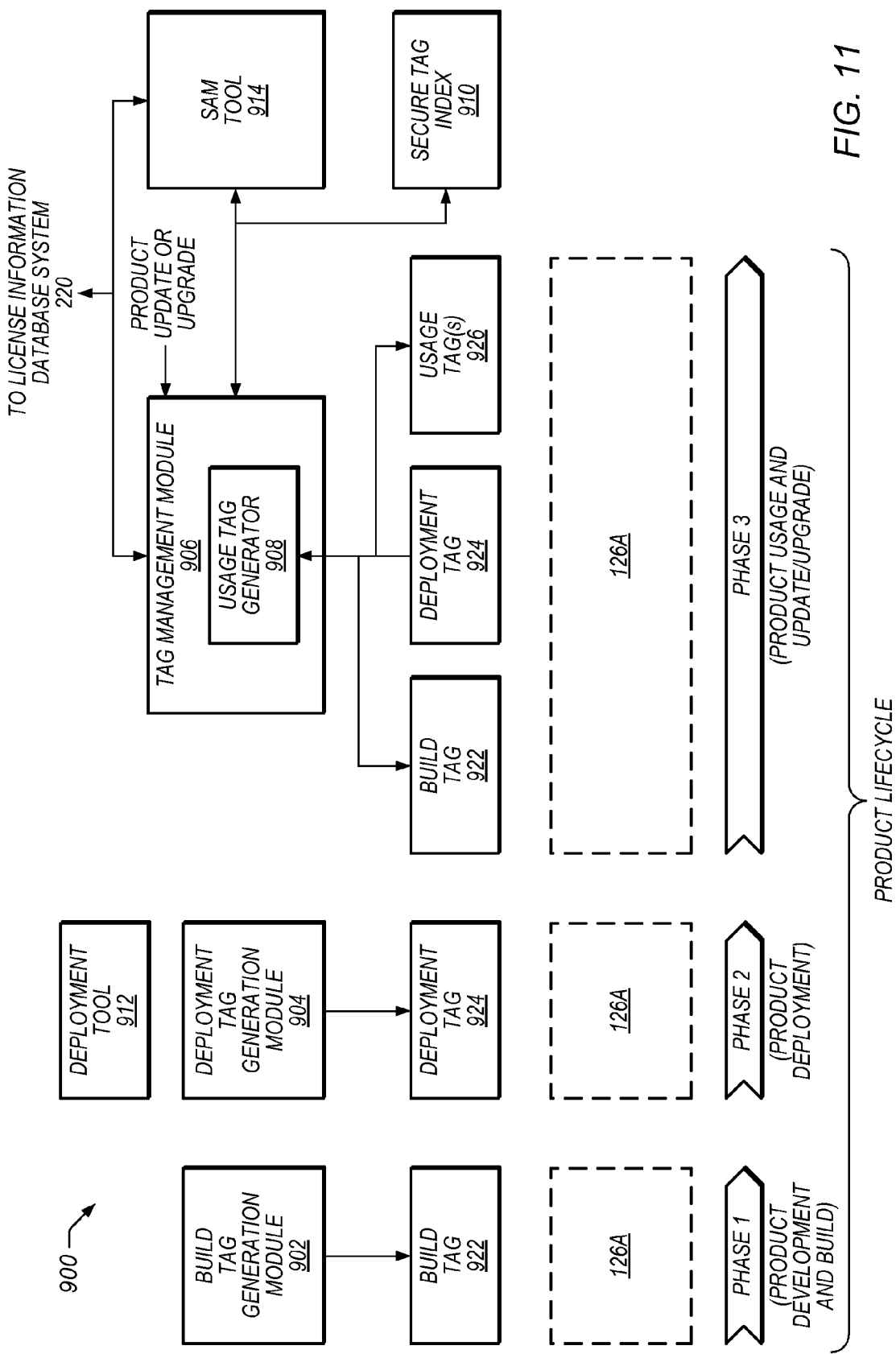
FIG. 11 is a block diagram of another embodiment of an environment for providing software tagging to facilitate software asset management.

In yet further embodiments, the tagging paradigm of environment 900 may utilize fingerprinting techniques as described above to associate individual copies of one or more software applications with license information that identifies the license agreement to which each copy is applicable. For example, as illustrated in FIG. 11, in some embodiments, tag management module 908 and/or SAM tool 914 may be configured to communicate with the license information database system 220 (as described previously with reference to FIGS. 1-8). In such embodiments, a fingerprint as described above may be generated for a copy of a software application (e.g., copy 126A), and may be included with the information contained in build tag 922 and/or deployment tag 924. For example, in one implementation, a fingerprint may be represented by the "Deployment Reference #" attribute identified above of deployment tag 924. Thus, in such an implementation, the functionality of fingerprint generation unit 210 as described above may be included within build tag generation module 902 and/or deployment tag generation module 904. Likewise, functionality similar to that of software inventory tool 260 described above with reference to FIGS. 1-8 may be included within, for example, SAM tool 914 to allow reading of fingerprints associated with copies of software applications and retrieval of corresponding license information from license information database system 220 (e.g., by conveying one or more software inventory requests including a set of fingerprints, and providing the requests to database system 220). In such embodiments, SAM tool 910 may be configured to read fingerprints corresponding to particular copies of software applications from secure tag index 910 (or alternatively from corresponding files containing the respective tags). Using license information retrieved from license information database system 220, SAM tool 910 may further be configured to reconcile actual software usage (including deployment) with license rights, as discussed above with reference to FIG. 6.

It is noted that in various additional embodiments, license information, including information that identifies the license agreement to which a given copy of a software application is applicable, may be contained within the build tag and/or deployment tag created for that copy (i.e., in such embodiments, license information as described above that might otherwise be contained in a given record of license information database system 220 may alternatively be contained within the build tag and/or deployment tag created for a corresponding copy of a software application). SAM tool 910 may be configured to use this information to reconcile actual software usage with license rights, as discussed above, and to provide reports including information indicative of (or relating to) license compliance.

The environment 900 described with reference to FIGS. 9-11 may thus provide and process secured, dynamic and persistent tagging of software deployments and usage. The described functionality may further be implemented across mixed and multiple software platforms even though each platform may require a platform specific implementation.

Turning now to FIG. 12, one embodiment of a computer system 1200 is depicted. The present disclosure has described various embodiments that include computer systems, including computer systems that execute programs (e.g., software inventory tool 260), computer systems that implement a database (e.g., license information database system 220), and computer systems that store one or more copies of software applications having associated fingerprints as described above. The disclosed computer systems may be any suitable type of computing device. As shown, computer system 1200 includes a processor subsystem 1280 that is coupled to a memory 1220 and I/O interfaces(s) 1240 via an interconnect 1260 (e.g., a system bus). I/O interface(s) 1240 is coupled to one or more I/O devices 1250. Computer system 1200 may be any of various types of devices, including, but not limited to, a personal computer system, desktop computer, laptop or notebook computer, mainframe computer system, handheld computer, workstation, network computer, a consumer device such as a mobile phone, pager, or personal data assistant (PDA). Computer system 1200 may also be any type of networked peripheral device such as storage devices, switches, modems, routers, etc. Although a single computer system 1200 is shown in FIG. 12 for convenience, system 1200 may also be implemented as two or more computer systems operating together. In one embodiment, computer system 1200 is an application server that stores multiple copies of fingerprinted software applications.

Processor subsystem 1280 may include one or more processors or processing units. For example, processor subsystem 1280 may include one or more multi-processor cores, each with its own internal communication and buses. In various embodiments of computer system 1200, multiple instances of processor subsystem 1280 may be coupled to interconnect 1260. In various embodiments, processor subsystem 1280 (or each processing unit within 1280) may contain a cache or other form of on-board memory.

Computer system 1200 also contains memory 1220 which is usable by processor subsystem 1280. Memory 1220 may be implemented using different physical memory media, such as hard disk storage, floppy disk storage, removable disk storage, flash memory, random access memory (RAM-SRAM, EDO RAM, SDRAM, DDR SDRAM, Rambus® RAM, etc.), ROM (PROM, EEPROM, etc.), and so on.

I/O interfaces 1240 may be any of various types of interfaces configured to couple to and communicate with other devices, according to various embodiments. In one embodiment, I/O interface 1240 is a bridge chip from a front-side to one or more back-side buses.

I/O interfaces 1240 may be coupled to one or more I/O devices 1250 via one or more corresponding buses or other interfaces. Examples of I/O devices include storage devices (hard drive, optical drive, removable flash drive, storage array, SAN, or their associated controller), network interface devices (e.g., to a local or wide-area network), or other devices (e.g., graphics, user interface devices, etc.). In one embodiment, computer system 1200 is coupled to a network via a network interface device; this network interface device may permit a program such as software inventory tool 260 to search computer system 1200 for fingerprinted copies of software applications.

Memory in computer system 1200 is not limited to memory 1220. Rather, computer system 1200 may be said to have a "memory subsystem" that includes various types/locations of memory. For example, the memory subsystem of computer system 1200 may, in one embodiment, include memory 1220, cache memory in processor subsystem 1280, and storage on I/O Devices 1250 (e.g., a hard drive, storage array, etc.). Thus, the phrase "memory subsystem" is representative of various types of possible memory media within computer system 1200. In some embodiments, the memory subsystem stores program instructions executable by processor subsystem 1280 to perform embodiments of various program described in the present disclosure. Alternatively, the memory subsystem of computer system 1200 facilitates the storing of license information in a database, or stores copies of fingerprinted software applications.

Various embodiments of programs described herein may include storing instructions and/or data implemented in accordance with the foregoing description in an article of manufacture such as a tangible computer-readable memory medium, including various portions of the memory subsystem of computer system 1200. Certain embodiments of these tangible computer-readable memory media may store instructions and/or data that are computer executable to perform actions in accordance with the present disclosure. Generally speaking, such an article of manufacture may include storage media or memory media such as magnetic (e.g., disk) or optical media (e.g., CD, DVD, and related technologies, etc.). The article of manufacture may be either volatile or nonvolatile memory. For example, the article of manufacture may be (without limitation) SDRAM, DDR SDRAM, RDRAM, SRAM, flash memory, and of various types of ROM, etc. FIGS. 2A and 2B, for example, include tangible computer-readable media 212 and 222, which are respectively usable to store program instructions for generating fingerprints and facilitating the storage of license information in license information database system 220.

Further embodiments of programs described herein may include storing/encoding instructions and/or data on signals such as electrical, electromagnetic, or optical signals, conveyed via a communication medium, link, and/or system (e.g., cable, network, etc.), whether wired, wireless or both. Such signals may carry instructions and/or data implemented in accordance with the foregoing description. For example, signals encoded with a software inventory request as described above may be transmitted over various types of computer networks.

Although specific embodiments have been described above, these embodiments are not intended to limit the scope of the present disclosure, even where only a single embodiment is described with respect to a particular feature. Examples of features provided in the disclosure are intended to be illustrative rather than restrictive unless stated otherwise. The above description is intended to cover such alternatives, modifications, and equivalents as would be apparent to a person skilled in the art having the benefit of this disclosure.

The scope of the present disclosure includes any feature or combination of features disclosed herein (either explicitly or implicitly), or any generalization thereof, whether or not it mitigates any or all of the problems addressed herein. Accordingly, new claims may be formulated during prosecution of this application (or an application claiming priority thereto) to any such combination of features. In particular, with reference to the appended claims, features from dependent claims may be combined with those of the independent claims and features from respective independent claims may be combined in any appropriate manner and not merely in the specific combinations enumerated in the appended claims.

The invention claimed is:

1. A method, comprising: a computer system storing fingerprints in a database along with license information for copies of one or more software applications stored on computer systems of a licensee, wherein the stored fingerprints are unique identifiers associated with respective ones of the copies, and wherein the license information stored in the database for a given copy of a software application indicates a version of a license agreement that is applicable to the given copy;

the computer system receiving a software inventory request from the licensee, wherein the software inventory request is generated by a software inventory tool executable to collect ones of the stored fingerprints, and wherein the software inventory request includes a set of one or more collected fingerprints; and in response to the software inventory request, the computer system providing license information stored in the database to the licensee.

2. The method of claim 1, further comprising: the computer system distributing individual copies of the one or more software applications to computer systems of the licensee.

3. The method of claim 1, wherein the software inventory tool is executable to place a fingerprint associated with a copy of a software application in a tamper-proof file associated with the copy of the software application.

4. The method of claim 1, wherein the stored fingerprints are generated randomly, and include a fingerprint indicative of an upgraded copy of a software application.

5. The method of claim 1, wherein the database is maintained by a distributor of the copies of the one or more software applications.

6. A computer-implemented method, comprising: software inventory tool collecting a set of fingerprints, wherein the fingerprints are unique identifiers associated with respective copies of one or more software applications installed on a set of computer systems;
the software inventory tool conveying the set of fingerprints to a license information database system, wherein the license information database system stores license information for copies of the one or more software applications having associated fingerprints; and
the software inventory tool receiving license information from the license information database system responsive to the conveyed set of unique fingerprints, wherein the received license information includes information indicating, for a given copy of a software application installed on one of the set of computer systems, the applicable software license agreement.

7. The method of claim 6, wherein the set of computer systems are computer systems of a software licensee, the method further comprising the software licensee receiving copies of the one or more software applications from a first software distributor.

8. The method of claim 6, further comprising:
the software inventory tool reconciling usage of software permitted by applicable license agreements with actual usage of the software.

9. The method of claim 6, wherein the software inventory tool is configured, for a given copy of a software application, to access one or more corresponding files for a fingerprint.

10. The method of claim 9, wherein a fingerprint associated with a given copy of a software application installed on one of the set of computer systems is located in a file accessible only by the software inventory tool.

11. The method of claim 9, wherein a fingerprint associated with a given copy of a software application installed on one of the set of computer systems is located in a file accessible only by the software inventory tool and the given copy of the software application.

12. The method of claim 6, further comprising: the software inventory tool analyzing usage of licensed copies of the one or more software applications, wherein the analyzing is based at least in part on said received license information.

13. The method of claim 6, further comprising: the software inventory tool determining software usage that is inconsistent with licensed rights.

14. The method of claim 6, wherein the set of computer systems are those of a software licensee, and wherein the software inventory tool is running on a computer system that is remote from the set of computer systems.

15. A system, comprising: a first set of computer systems on which copies of one or more software applications from a software distributor are installed;
a computer system comprising one or more processors and memory storing program instructions of a software inventory tool executable to:
collect a set of fingerprints, wherein the fingerprints are unique identifiers associated with respective ones of the copies of the one or more software applications installed on the first set of computer systems;
convey the set of fingerprints to a license information database system, wherein the license information database system is configured to store fingerprints along with license information for copies of the one or more software applications;
responsive to the conveyed set of fingerprints, receive license information from the license information database system, wherein the received license information includes information indicative of the applicable license agreement for a given copy of a software application corresponding to one of the conveyed set of fingerprints.

16. A non-transitory computer-readable medium storing program instructions of a software inventory tool executable by a computer system to:
automatically generate unique fingerprints for individual copies of software applications licensed by a software licensee from a software distributor;
associate the generated fingerprints with respective copies of software applications by placing each generated fingerprint in a tamper-proof location;
wherein the generated fingerprints are providable as inputs to a license information database system to obtain license information indicative of the respective versions of the license agreements between the software licensee and the software distributor that are applicable to the copies of the software applications that correspond to the generated fingerprints.

17. A non-transitory computer-readable medium storing program instructions of a software inventory tool executable by a computer system to:
collect a set of fingerprints, wherein the fingerprints are unique identifiers associated with respective copies of software applications installed on one or more computer systems of a software licensee;
convey a software inventory request including the set of fingerprints to a license information database system storing fingerprints and license information;
responsive to the software inventory request, receive license information indicative of the respective versions of the license agreements that are applicable to the copies of software applications corresponding to the set of fingerprints.

18. A system, comprising:
one or more processors;
a storage subsystem storing program instructions executable by the one or more processors to:
store fingerprints in a database along with license information for copies of one or more software applications stored on computer systems of a licensee, wherein the stored fingerprints are unique identifiers associated with respective ones of the copies;
receive, from a software inventory tool, a software inventory request that includes one or more of the stored fingerprints;
responsive to the request, provide license information that includes information indicative of the respective versions of the license agreements that are applicable to the copies of software applications corresponding to the one or more fingerprints included in the inventory request.

* * * * *